United States Patent [19]

Carmien

[11] Patent Number: 4,771,736
[45] Date of Patent: Sep. 20, 1988

[54] POULTRY WATERING CUP VALVE AND SEAL THEREFOR

[76] Inventor: Joseph A. Carmien, 525 N. Maple Dr., Beverly Hills, Calif. 90210

[21] Appl. No.: 892,574

[22] Filed: Aug. 1, 1986

[51] Int. Cl.[4] .................. A01K 39/02; A01K 7/06
[52] U.S. Cl. ........................ 119/75; 119/72.5
[58] Field of Search ................... 119/75, 72.5

[56] References Cited

U.S. PATENT DOCUMENTS

| | | | |
|---|---|---|---|
| 2,319,928 | 5/1943 | Hart | 119/75 |
| 2,845,046 | 7/1958 | Hart | 119/75 |
| 3,306,262 | 2/1967 | Hart | 119/72 |
| 3,353,518 | 11/1967 | Hart | 119/75 |
| 3,405,686 | 10/1968 | Hart | 119/75 |
| 3,428,028 | 2/1969 | Hart | 119/75 |
| 3,520,281 | 7/1970 | Hart | 119/75 |
| 3,664,305 | 5/1972 | Hart et al. | 119/72 |
| 3,826,467 | 7/1974 | Hart et al. | 251/284 |
| 3,870,022 | 3/1975 | Hart | 119/75 |
| 3,940,106 | 2/1976 | Hart et al. | 241/100 |
| 3,952,706 | 4/1976 | Hart | 119/75 |
| 3,964,440 | 6/1976 | Hart | 119/18 |
| 3,983,844 | 10/1976 | Hart | 119/75 |
| 4,282,831 | 8/1981 | Nilsen | 119/75 |
| 4,471,722 | 9/1984 | Dube et al. | 119/75 |
| 4,476,812 | 10/1984 | Dube et al. | 119/75 |
| 4,637,345 | 1/1987 | Hostetler | 119/72.5 |

*Primary Examiner*—Paul J. Hirsch
*Attorney, Agent, or Firm*—Kelly, Bauersfeld & Lowry

[57] ABSTRACT

A poultry watering cup valve for controlling the flow of water from a water feed line to a poultry watering cup includes, generally, a substantially hollow valve housing extending from the watering cup for engaging the water feed line, and an improved valve seal positioned within the feed line and over the end of the valve housing opposite the watering cup. A shaft extending through the valve housing supports the valve seal adjacent a valve inlet aperture. In one preferred form, the valve seal includes an integral O-ring which can prevent fluid flow from the feed line through the valve inlet aperture. In another preferred form, the valve seal is provided a second integral O-ring which, like the first O-ring, can also prevent fluid flow from the feed line through the valve inlet aperture.

17 Claims, 1 Drawing Sheet

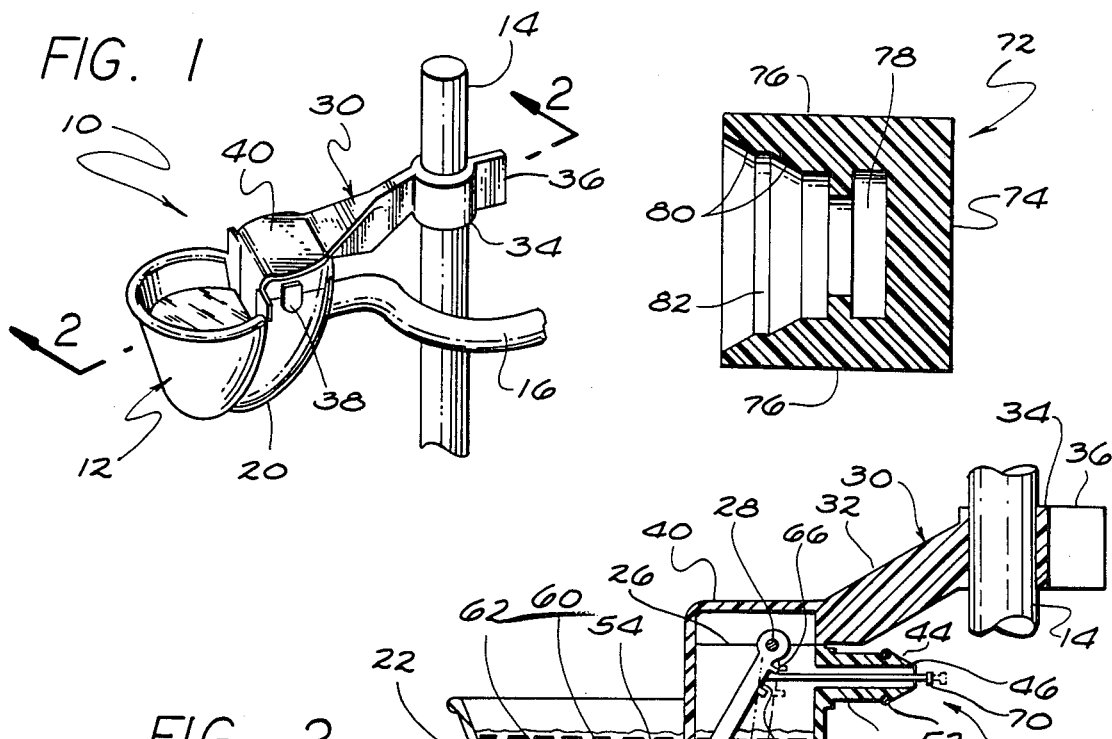
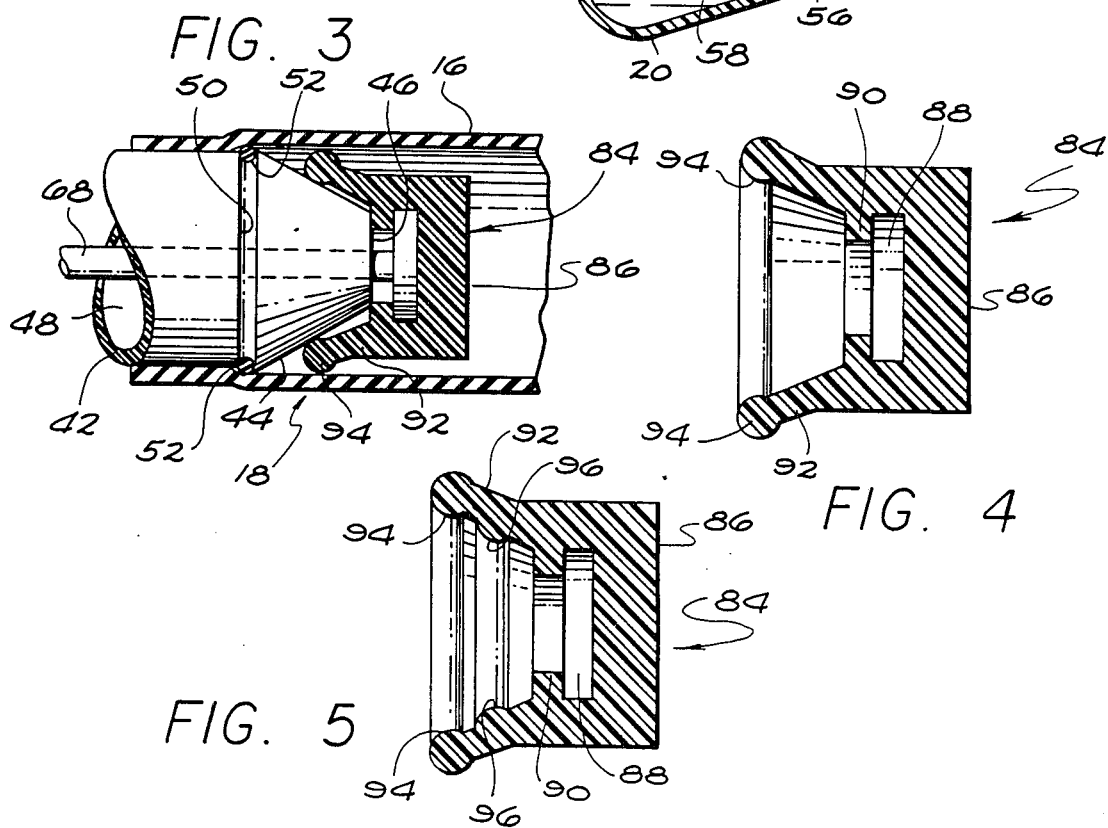

POULTRY WATERING CUP VALVE AND SEAL THEREFOR

BACKGROUND OF THE INVENTION

This invention relates generally to low pressure poultry watering systems, and, more specifically, to valves and valve seals used in such systems for controlling the flow of water from a water feed line to a poultry watering cup.

Progressively, the commercial production of both eggs and chickens for broiling or cooking has advanced from the farmer with only a few hundred chickens to today's commercial producers who may have as many as one million or more birds in one location. As the size of commercial poultry operations has grown, so too has the significance of modern and reliable feeding and watering operations.

Most modern commercial poultry watering operations utilize a large number of chicken drinking cups which are constructed to automatically remain filled within a predetermined water level range. Today's largest poultry houses may have fifteen thousand such watering cups, and the poultry complex under the management and control of a single commercial producer may have ten houses on one site. Thus, there can be as many as one hundred fifty thousand such watering cups under one farm manager's domain.

It is apparent that due to the shear size of today's commercial poultry operations, it is imperative that watering systems be utilized which keep the drinking water in the cups, as opposed to the floor, and minimize leaks. It is well known that leaks through any such watering system can cause serious health problems to the poultry, both from resultant dampness and from the mixing of water with poultry manure to create ammonia and other dangerous and undesirable air contaminants. Indeed, the health problems to the poultry caused by the mixing of manure and water have prompted many large producers to install air quality sensors and large fans within the chicken houses in attempts to regulate the quality of the air within the houses. Leaking cups can, moreover, cause structural problems to the buildings, as well as pose environmental problems such as stream, lake and river pollution, and fly and odor problems.

Typically, poultry watering cups are connected to a low pressure water feed line, and the water flow through the feed line into the cup is regulated by a valving system utilizing a valve sealing cap. Whatever the valving system utilized for watering the poultry operation, it is critical that the valve sealing cap be capable of properly performing its sealing function at extremely low water feed line pressures. For example, to start baby chicks, the water feed line pressure may be set at three-quarter pounds or so. This value ranges upwardly to four pounds pressure on trigger cups. The valve sealing cap is also subjected to occasional pressure fluctuation such as sudden drops in pressure caused by peak demand for water, which occurs immediately after a feeding. Therefore, any seal design must be extremely sensitive with regard to the water pressure within the feed line. Further, the water valving system, and particularly the valve seal, must perform properly in the presence of contaminants in the water or hard particles such as chemicals in the water for medication or for other reasons, and must perform at both high and low temperatures to name but a few commonly encountered operating conditions.

A typical watering cup valve includes a hollow stem which engages an end of the water feed line, which stem forms a surface resembling a frustum of a cone having a valve inlet passageway situated therethrough. A rod or shaft extends through this passageway to support the valve seal in a position whereby the water pressure within the water feed line would normally urge the valve seal against the frustum portion of the stem to close the valve to fluid flow therethrough. Only when the valve seal is forced away from the stem frustum portion should water be allowed to pass through the valve inlet. When this opening force is removed, the water pressure within the water feed line is intended to cause the valve seal to once again engage the frustum portion of the stem and close the valve to flow.

Prior art valve seals, such as that illustrated in FIG. 6 of the accompanying drawings, usually have an internal taper which forms a feather sealing edge about the open end of the valve seal. This feather edge is designed to be slightly distorted by the water pressure within the water feed line and create a seal between the valve stem frustum portion and the internal face of the feather edge. It has been found that this feather edge valve seal is the essential shortcoming of the prior art poultry watering cup valve. The feather sealing edge of the prior art valve seal must maintain its integrity consistently and continuously under every conceivable operating condition, because even a minuscule break in contact along this feather edge will allow water to leak into the cup and eventually cause the cup to overflow and create the undesirable situations mentioned above. The criticality of the valve seal to the entire watering system is apparent when one considers that even a few drops leaking per cup over night, when the chickens are not drinking, can result in a literal flood of the chicken house.

It has been found that prior art feather edge valve seals can be quite easily distorted by their failure to resist chemical reaction with hard water or chemical additives to the water, and that they are subject to cold flow distortion when, for example, a spec of dust or other contaminant in the water becomes lodged under one edge in either a cold or hot condition. In sum, flaring out of the feather edge is considered by some to be inherent in the design of such valve seals, causing the same to inevitably flare and become incapable of forming a complete seal at low pressures with the valve stem, given enough time.

Previous attempts to solve some of the aforementioned problems with the feather edge valve seals have included the utilization of different materials, including thermoplastic materials such as vinyl, and other rubber-like materials. These materials have improved the valve seal's resistance to some of the conditions described above, but even the best have failed over a period of time due to the limitations of the feather edge design. Sometimes leaks don't show up when the water pressure within the feed line is at a normal poundage (for example two pounds), inasmuch as the water pressure is creating a sufficient force on the valve seal to hold it snuggly against the frustum portion of the valve stem. A drop of water pressure in borderline cases of seat distortion, however, will often allow water to leak past the valve seal through the valve inlet, resulting in undesirable water leakage.

Accordingly, there has been a need for an improved valve for controlling the flow of water from a water feed line to a poultry watering cup, which can satisfactorily prevent the flow of water from the feed line to the watering cup at virtually all normal operating pressures, and which is highly resistant to those factors which have caused prior valves to almost inevitably develop leaks. Such an improved valve should provide a reliable, non-fragile point contact seal which overcomes the drawbacks of the feather edge seal, and should be constructed of a material resistant to chemical or temperature degradation. Additionally, an improved valve seal is needed which, in connection with prior valves for controlling the flow of water from a water feed line to a poultry watering cup, can be substituted for prior valve seals to improve performance of the prior valves. Such improved valves and valve seals must be of simple construction, economical, and adaptable to various uses and requirements. The present invention fulfills these needs and provides other related advantages.

SUMMARY OF THE INVENTION

The present invention resides in an improved poultry watering system capable of efficiently controlling the flow of water from a water feed line to a poultry watering cup. The improved system comprises, generally, a water feed line extending from a water source, a watering cup including a poultry drinking trough and means for attaching the water feed line to the watering cup, and a valve for controlling the flow of water from the water feed line to the watering cup.

In a preferred form of the invention, the valve comprises a substantially hollow valve housing extending from the watering cup, which has a portion opposite the watering cup shaped to form a frustum of a cone. The interior of the valve housing is in open fluid communication with the watering cup and a valve inlet aperture through the frustum portion. The water feed line frictionally and sealingly engages the exterior of the valve housing so that water passing from the feed line to the watering cup must pass first through the valve inlet aperture and then through the valve housing interior.

A lever-actuated traversing shaft extends from the watering cup through the valve housing, and terminates at a flanged head situated outside and generally adjacent the valve inlet aperture. An improved valve seal, including a cap portion having means for removably attaching the improved valve seal to the flanged shaft head, is further attached to the flanged head of the lever-actuated traversing shaft. This improved valve seal is capable of forming a seal with the frustum portion of the valve housing in a manner preventing any fluid flow from the feed line through the valve inlet aperture to the watering cup.

A preferred form of the valve seal for use in such lower pressure watering system valves includes a skirt integrally formed with the cap portion, and at least one O-ring sealing means integrally formed with the skirt. The preferred valve seal is constructed so that the skirt substantially surrounds the valve inlet, and the O-ring sealing means is dimensioned and positioned with respect to the valve inlet to engage the frustum portion of the valve housing and prevent fluid flow through the valve inlet unless the valve seal is forceably displaced from the frustum portion.

The O-ring sealing means may include a single O-ring positioned along the edge of the skirt opposite the valve seal cap portion. The invention is, however, not so limited. Indeed, the O-ring sealing means may include a first O-ring positioned by the skirt about the opposite end of the valve seal with respect to the cap portion, as well as a second O-ring positioned by the skirt between the first O-ring and the cap portion.

To avoid some of the problems associated with prior valve seals for use in low pressure watering systems, it is preferred that the valve seals of the present invention be formed entirely of a thermosetting elastomeric compound such as a thermosetting silicone elastomeric compound. Such valve seal material effectively resists degradation of its sealing properties due to heat or chemical exposure, thus facilitating long term and reliable use of the same.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of an exemplary poultry watering system, including a poultry watering cup mounted on a post and connected to a water feed line;

FIG. 2 is an enlarged fragmented elevational sectional view taken generally along the line 2—2 of FIG. 1, illustrating the specific construction of the poultry watering cup and its associated valve housing and lever-actuated traversing shaft;

FIG. 3 is a fragmented elevational and partially sectional view of a valve for controlling the flow of water from the water feed line to the poultry watering cup, including an improved valve seal of the present invention securely affixed to a flanged head of the traversing rod, and positioned by the force of water within the water feed line against a frustum portion of the valve housing to prevent the flow of fluid from the feed line through a valve inlet aperture;

FIG. 4 is an enlarged sectional view of the valve seal illustrated in FIG. 3;

FIG. 5 is a sectional view similar to that shown in FIG. 4, illustrating an alternative valve seal which includes a second integral O-ring supported by a valve seal skirt; and FIG. 6 is a sectional view similar to FIG. 4, illustrating the construction of a prior art valve seal utilizing a feather edge as means for effecting a seal between the frustum portion of the valve housing and the valve seal.

DETAILED DESCRIPTION OF THE PREFERED EMBODIMENTS

As shown in the drawings for purposes of illustration, the present invention is concerned with an improved poultry watering system, generally designated by the reference number 10. The poultry watering system 10 includes, generally, a poultry watering cup 12 which, as shown in FIG. 1, can be supported by an ordinary post 14 or the like, a water feed line 16 which extends from a water source (not shown) to the watering cup, and a valve 18 for controlling the flow of water from the water feed line to the poultry watering cup.

As best illustrated in FIGS. 1 and 2, the poultry watering cup 12 comprises a cup body 20 which forms an outer trough 22 accessible to the poultry, and an inner trough 24 wherein a lever mechanism is situated for selectively opening the valve 18. An upper edge 26 of the cup body 20 supports an actuating lever pivot 28 forming a portion of the lever mechanism (which will be more fully discussed below). This upper edge 26 of the cup body 20 is securely affixed to a cup support 30 which includes a supporting arm 32 and a post clamp 34 for securing the watering cup 12 to the post 14. To facilitate handling of the poultry watering cup 12 and attachment of the same to the post 14, the cup support 30 further includes a handling tab 36.

To support and enclose the lever mechanism within the inner trough 24, the cup support 30 also provides lateral wings 38 intended to cover the exposed ends of the pivot 28 and provide a housing for those exposed ends wherein the pivot may rotate if necessary. Moreover, an upper lever mechanism housing 40 is attached to both the cup support 30 and the cup body 20 in a manner overlying the inner trough 24 and providing a partial barrier between the inner trough and the outer trough 22.

The valve 18 for controlling the flow of water from the water feed line 16 to the poultry watering cup 12 includes a substantially hollow, cylindrical valve housing 42 extending from the watering cup 12 having an end 44 opposite the watering cup shaped to form a frustum of a cone and including an aperture 46 providing a valve inlet. The valve housing 42 is constructed so that its interior 48 is always in open fluid communication with the inner trough 24 of the watering cup 12. A groove 50 circumscribes a portion of the valve housing 42 wherein a conventional O-ring 52 may be positioned for ensuring that a seal is formed when the water feed line 16 is positioned over the valve housing 42 (see FIG. 3).

The lever mechanism includes an actuating lever 54 which pivots at its upper end upon the pivot 28. This actuating lever 54 includes a primary lever member 56 which extends downwardly from the pivot 28 into the inner trough 24, and an integral actuating foot 58 which angles from the primary lever member 56 into the outer trough 22. The end 60 of the actuating foot 58 is widened to provide a striking plane so that as the water 62 within the watering cup 12 drops to a predetermined level, the beak of the chicken will strike that broadened end and cause the actuating lever 54 to rotate toward the position shown in phantom in FIG. 2. This actuating lever 54 is preferably constructed of a material having a density equivalent to or less than that of water to minimize the tendency of the actuating lever to rotate downwardly in the absence of forceful displacement by the chicken.

The side of the primary lever member 56 generally disposed toward the valve housing 42 is provided an enlarged cam surface 64 surrounded by a rim 66. The purpose of this cam surface 64 and rim 66 is to provide a defined area where the actuating lever 54 engages a traversing valve shaft 68 which extends generally from the cam surface 64, through the interior 48 of the valve housing 42, and out the valve inlet aperture 46. The shaft terminates in a flanged head 70. Thus, as illustrated best in FIG. 2, the downward movement of the actuating lever 54 results in horizontal traversing movement of the shaft 68 in a manner causing the flanged head 70 to move away from the valve inlet aperture 46. In prior poultry watering systems, the low pressure valve seal utilized was typically of the feather sealing edge type, such as the valve seal 72 illustrated in FIG. 6. Such prior valve seals 72 included, generally, a cap 74 integrally formed with a tapered or feather edge skirt 76 designed to engage the frustum end 44 of the valve housing 42. More specifically, the cap 74 is formed to include a cavity 78 for retaining the flanged head 70 of the valve shaft 68 therein. Extending outwardly from this cavity 78 is a generally uniform tapered surface 80, interrupted only by a slight deviate surface 82. When positioned over the end of the valve shaft 68 with the flanged head 70 situated within the cavity 78, the water pressure within the water feed line 16 is intended to exert sufficient force upon the valve seal 72 to cause the internal surfaces 80 and 82 thereof to engage the frustum end 44 of the valve housing 42 and form a watertight seal. As set forth fully above, however, such prior feather edge valve seals have serious drawbacks which lead to unacceptable leakage past the valve seal 72 due to, among other things, temperature and chemical degradation of the feather edge skirt 76.

In accordance with the present invention, and as best illustrated in FIGS. 3–5, the disadvantages of the prior feather edge valve seal 72 can be effectively overcome through the incorporation of an O-ring integrally molded into the valve seal at the location of the prior feather edge skirt 76. More specifically an improved valve seal 84 constructed in accordance with the present invention comprises a cap portion 86 similar to the cap 74, forming a cavity 88 for retaining the flanged head 70 of the valve shaft 68. This cap portion 86 includes a head retaining lip 90 which is sufficiently flexible to permit passage of the flanged head 70 past the retaining lip and into the cavity 88. A skirt 92 is integrally formed with the cap portion 86, and extends outwardly therefrom to substantially surround the valve inlet aperture 46 and a portion of the frustum end 44 of the valve housing 42. An O-ring 94 is integrally molded with the skirt 92 and the cap portion 86 to form the opposite end of the improved valve seal 84 with respect to the cap portion 86, and is dimensioned to sealingly engage the frustum portion 44 of the valve housing 42. As illustrated in FIG. 5, a second O-ring 96 may further be integrally formed with the skirt 92 and positioned between the first O-ring 94 and the cap portion 86 of the improved valve seal 84.

The improved valve seal 84 of the present invention is intended to function in a manner substantially identical to that of the prior valve seal 72. More specifically, when the flanged head 70 is properly positioned within the cavity 88 and water pressure within the water feed line 16 bears upon the improved valve seal 84, the improved valve seal, together with the valve shaft 68, will tend to move in a manner allowing the O-ring 94 (and if provided, the second O-ring 96) to engage the frustum end 44 of the valve housing 42. As the chicken drinks water 62 from the outer trough 22, it will at times strike the end 60 of the actuating foot 58, causing displacement of the valve shaft 68 which allows water to pass through the valve inlet aperture 46. When this displacing force is released from the actuating lever 54, the water pressure within the water feed line 16 will once again cause the improved valve seal 84 to move toward the valve housing 42 in a manner preventing any fluid flow from the water feed line through the valve inlet aperture 46 to the watering cup 12.

In addition to the improved construction of the valve seal 84 as described above, it has been found that the selection of materials for use in constructing the valve seal is critical to minimize or eliminate temperature and chemical degradation thereof. To this end, it has been found that thermosetting elastomeric compounds, and specifically thermosetting silicone elastomeric compounds eliminate the problems of prior art valve seals caused by cold flow, and are far more resistant to chemical degradation than the typical vinyl materials used in prior valve seals.

From the foregoing it is to be appreciated that the most reliable seal for preventing fluid flow is one which provides a point contact, such as the O-rings 94 and 96 of the present invention, because any contaminant that might be present in the water 62 will have the least chance of lodging under the portion of the improved seal 84 abutting against the frustum end 44 of the valve housing 42. Further, the cylindrical integrity of the O-rings 94 and 96 is inherently stronger and far superior to the prior feather edge seal design in resisting cold flow or permanent distortion of the sealing surfaces. The provision of O-ring sealing means in the improved valve seal 84 represents much more than a mere cosmetic change to the known valve seal 72. The present invention represents an advance which virtually eliminates all of the shortcomings in the feather edge type seals which permitted unacceptable levels of leakage.

Although particular embodiments of the invention have been described in detail for purposes of illustration, various modifications may be made without departing from the spirit and scope of the invention. For example, it should be apparent that the end 44 of the valve housing 42 could be shaped to form an internal frustum of a cone, rather than the external frustum-like surface illustrated. With such a valve housing 42 design, the improved valve seal 84 would be slightly modified from those shown to ensure that the O-ring sealing means could sealingly engage the internal frustum surface of the end 44. Accordingly, the invention is not to be limited, except as by the appended claims.

I claim:

1. A valve for controlling the flow of water from a water feed line to a poultry watering cup, the valve comprising:
   a substantially hollow valve housing extending from the watering cup, the interior of the valve housing being in open fluid communication with the watering cup, and the end of the valve housing opposite the watering cup being shaped to form a frustum of a cone and including an aperture providing a valve inlet, wherein the water feed line frictionally and sealingly engages the exterior of the valve housing so that water passing from the feed line to the watering cup must pass first through the valve inlet aperture and then through the valve housing interior;
   a valve seal positioned within the feed line and over the end of the valve housing opposite the watering cup, the valve seal including at least one O-ring sealing means dimensioned to sealingly engage the end of the valve housing opposite the watering cup in a manner preventing any fluid flow from the feed line through the valve inlet aperture; and
   means for positioning the valve seal over the end of the valve housing opposite the watering cup.

2. A valve as set forth in claim 1, wherein the positioning means includes a shaft extending from the watering cup, through the valve housing and valve inlet aperture, and terminating at a flanged head generally adjacent the valve inlet aperture, the valve seal including a cap portion having means for retaining the flanged head securely within the valve seal.

3. A valve as set forth in claim , wherein the valve seal includes a skirt integrally formed with the cap portion, the skirt substantially surrounding the end of the valve housing opposite the watering cup, and wherein the at least one O-ring sealing means is positioned by the skirt about the opposite end of the valve seal with respect to the cap portion.

4. A valve as set forth in claim 3, wherein the at least one O-ring sealing means includes a first O-ring positioned by the skirt about the opposite end of the valve seal with respect to the cap portion, and a second O-ring positioned by the skirt between the first O-ring and the cap portion.

5. A valve as set forth in claim 3, wherein the valve seal is formed entirely of a thermosetting silicone elastomeric compound.

6. A poultry watering system, comprising:
   a water feed line extending from a water source;
   a watering cup including a poultry drinking trough and means for attaching the water feed line to the watering cup, the attaching means including a substantially hollow, cylindrical member attached to the drinking trough and extending therefrom, the interior of the cylindrical member being in open fluid communication with the drinking trough, and the end of the cylindrical member opposite the drinking trough being shaped to form a frustum of a cone and including an aperture providing a watering cup inlet, wherein the water feed line frictionally and sealingly engages the exterior of the cylindrical member so that water passing from the feed line to the drinking trough must pass first through the watering cup inlet and then through the cylindrical member interior;
   a shaft extending from the drinking trough through the cylindrical member and watering cup inlet, and terminating at a flanged head generally adjacent the watering cup inlet aperture;
   means within the drinking trough for displacing the shaft along its longitudinal axis; and
   a valve seal positioned within the water feed line and over the end of the cylindrical member opposite the drinking trough, the valve seal including at least one O-ring sealing means dimensioned to sealingly engage the end of the cylindrical member opposite the drinking trough in a manner preventing any fluid flow from the water feed line through the watering cup inlet aperture, and further including means for attaching the valve seal to the shaft flanged head.

7. A system as set forth in claim 6, wherein the valve seal includes a skirt integrally formed with the attaching means and substantially surrounding the watering cup inlet, wherein the at least one O-ring sealing means is positioned by the skirt about the opposite end of the valve seal with respect to the attaching means.

8. A system as set forth in claim 7, wherein the at least one O-ring sealing means includes a first O-ring positioned by the skirt about the opposite end of the valve seal with respect to the attaching means, and a second O-ring positioned by the skirt between the first O-ring and the attaching means.

9. A system as set forth in claim 8, wherein the valve seal is formed entirely of a thermosetting elastomeric compound.

10. A system as set forth in claim 9, wherein the sealing cap is formed entirely of a thermosetting silicone elastomeric compound.

11. A valve seal for use in a low pressure watering system valve having an inlet and means for positioning the valve seal over the inlet, the valve seal comprising:

a cap portion having means for attaching the valve seal to the positioning means;

a skirt integrally formed with the cap portion the skirt substantially surrounding the valve inlet; and at least one O-ring sealing means integrally formed with the skirt, the at least one 0-ring sealing means being dimensioned and positioned with respect to the valve inlet to prevent flow of fluid through the valve unless the valve seal is forceably displaced from a sealing position by movement of the positioning means.

12. A valve seal as set forth in claim 11, wherein the positioning means includes a lever-actuated traversing shaft which extends through the valve inlet, and the valve seal attaching means includes means for fixing the valve seal to an end of the traversing shaft.

13. A valve seal as set forth in claim 12, wherein the end of the traversing shaft forms a flanged head, and the valve seal fixing means includes a head retaining lip within the valve seal, the retaining lip engaging the flanged head to hold it securely within the cap portion of the valve seal.

14. A valve seal as set forth in claim 11, wherein the at least one O-ring sealing means is positioned by the skirt about the opposite end of the valve seal with respect to the cap portion.

15. A valve seal as set forth in claim 11, wherein the at least one O-ring sealing means includes a first O-ring positioned by the skirt about the opposite end of the valve seal with respect to the cap portion, and a second O-ring positioned by the skirt between the first O-ring and the cap portion.

16. A valve seal as set forth in claim 11, formed entirely of a thermosetting elastomeric compound.

17. A valve seal as set forth in claim 16, formed entirely of a thermosetting silicone elastomeric compound.

* * * * *

UNITED STATES PATENT AND TRADEMARK OFFICE
CERTIFICATE OF CORRECTION

PATENT NO. : 4,771,736

DATED : September 20, 1988

INVENTOR(S) : Joseph A. Carmien

It is certified that error appears in the above-identified patent and that said Letters Patent is hereby corrected as shown below:

```
In column 5, line 61, begin a new paragraph after ".".

In claim 3, line 1, after "claim" insert --2--.
```

Signed and Sealed this

Seventeenth Day of January, 1989

*Attest:*

DONALD J. QUIGG

*Attesting Officer*       *Commissioner of Patents and Trademarks*